Dec. 24, 1963 O. TASCHINGER 3,115,572
METHOD OF SPOT WELDING LIGHT-GAGE METALLIC STOCK
Filed Jan. 3, 1962
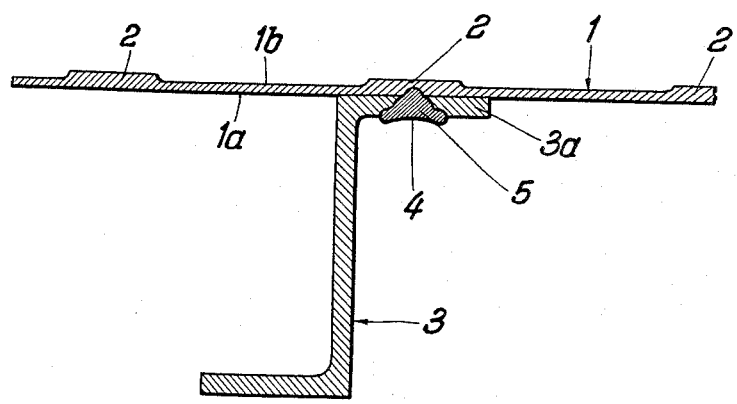
Inventor:
OTTO TASCHINGER
BY Michael S. Striker
his ATTORNEY

United States Patent Office 3,115,572
Patented Dec. 24, 1963

3,115,572
METHOD OF SPOT WELDING LIGHT-GAGE METALLIC STOCK
Otto Taschinger, Gauting, Germany, assignor to Vereinigte Leichtmetall-Werke Gesellschaft mit beschränkter Haftung, Bonn, Germany
Filed Jan. 3, 1962, Ser. No. 164,095
9 Claims. (Cl. 219—127)

The present invention relates to welding of metallic bodies in general, and more particularly to a method of spot welding light-gage metallic stock, especially plates made of aluminum and/or aluminum alloys.

An important object of the invention is to provide a method of welding light-gage substantially plate like metallic stock according to which the distortion of the welded product is reduced to a minimum, according to which one side of the stock remains unmarked, and according to which welded joints of any desired strength may be obtained between a light-gage metallic plate and another metallic component despite the fact that the weld does not penetrate through the plate.

Another object of the invention is to provide a method of spot welding light-gage substantially plate like metallic stock which is especially useful in the production and assembling of railroad cars, and more particularly in the fastening of metallic walls to the skeleton of a railroad car.

A further object of the instant invention is to provide a method of the above outlined characteristics according to which any desired number of spot welds may be formed on a light-gage metallic plate without penetration of welds through the plate.

An additional object of the invention is to provide a method of the above outlined character according to which a light-gage metallic plate may be welded to one or more metallic components in such a way that one of its sides remains unmarked so that the unmarked side may be finished with utmost precision prior to the welding operation and that expensive aftertreatment of the plate may be dispensed with.

A concomitant object of the invention is to provide a spot welded structure which is produced in accordance with the above outlined method.

With the above objects in view, the invention resides in the provision of a method of bonding a first metallic component (e.g. the flange of a profiled bar forming part of the skeleton in a railroad vehicle) to the inner side of an externally ribbed light-gage substantially plate like second metallic component (e.g. a wall panel which is to be secured to the skeleton of the railroad vehicle), this method comprising the steps of placing the inner side of the second component against the first component so that the latter is at least partially aligned with at least one rib or with an otherwise configurated projection at the outer side of the second component, and spot welding the first component to the second component from the inner side of the second component by forming welds in the first component in such a way that the roots of the welds extend through the inner side of the second component and into the material of the aligned rib or ribs without, however, penetrating to the outer side of the second component.

The bonded-together components preferably consist of at least partially pure aluminum, and the second component may be provided with a plurality of spaced external ribs at least one of which may be aligned with the first component so that the spot welding operation may produce one or more rows of aligned welds.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings the single illustration of which is a section through a spot-welded structure obtained in accordance with the method of this invention.

Referring now in greater detail to the drawing, there is shown a spot welded structure comprising a first component in the form of a light-gage metallic plate 1, and a second component in the form of a profiled Z-bar 3 one flange 3a of which is welded to the smooth inner or rear side 1a of the plate 1 by a series of welds 5. The outer side 1b of the plate 1 is provided with spaced reinforcing projections in the form of ribs 2 whose width preferably exceeds the maximum transverse dimensions of lenticular welds 5, and the welds are formed in such a way that their roots extend into the inner side 1a of the plate 1, i.e. into the material of the respective rib 2. It is assumed that a series of aligned welds 5 is provided in the flange 3a in order to connect spaced points of the bar 3 to the plate 1.

For example, the component 3 may form part of a skeleton for a railroad vehicle, and the plate 1 then constitutes a panel of the outer wall or shell of the vehicle. The ribs 2 are provided at the outer (i.e. at the exposed) side of the wall so as to serve the dual purpose of improving the appearance of the vehicle and also of preventing penetration of the welds 5 to the outer sides 1b of the plates 2. In addition, the ribs prevent deformation of the plates under the action of intensive heat developing during the spot welding operation. This operation is carried out from the inner side 1a of the plate 1 in the direction indicated by the arrow 4. The thickness of the ribs 2 is selected in such a way that they prevent the penetration of welds 5 to the outer sides of the plates 1 even though the plates may be of light-gage metal, preferably aluminum or aluminum alloy.

It will be seen that the method of welding from the inner sides of externally ribbed light-gage metallic plates brings about the important advantage that the ribbed outer sides of the plates remain smooth and unmarked so that time-consuming and expensive surface treatments, such as grinding, polishing, lacquering, etc., may be dispensed with. Not only are the outer sides of the plates unmarked but the ribs may improve the appearance of the final product since they need not always be parallel with each other as shown in the drawing but may also form more or less complicated eye-pleasing patterns on the exterior of the plates.

Another important advantage of the above described method is that the bulky, expensive and complicated resistance arc welding apparatus of known design may be replaced by much smaller welding apparatus, preferably of the argon shielded-arc spot welding type. The welding operation preferably resorted to in the practice of this invention is known as the S.I.G.M.A. or "Argonarc" welding process. As is well known in the art, the welding operation on railroad cars whose length may equal or exceed 80 ft. is presently carried out in large halls with the help of resistance welding aggregates whose length is at least twice the length of a car (i.e. at least 160 ft.) so that the car may be advanced along the aggregate from a first position to a non-overlapping second position. By resorting to the method of this invention, the dimensions of the welding aggregates and the dimensions of the plants in which the welding operation is carried out may be reduced to an unexpectedly large degree with resultant savings in space, material and maintenance cost. As stated above, the ribs also prevent distortion (i.e. buckling, bending, contracting, etc.) of light-gage aluminum or aluminum-alloy plates which also contributes to improved appearance of the ultimate product.

It will be readily understood that the roots of the welds 5 may penetrate into the material of the ribs 2 to such an extent that they would be visible from the outer side of the plate 1 were they provided in the zones between the ribs. In selecting the depth of penetration of the welds into the material of the rib or ribs 2, the only precaution to be taken is to insure that the localized melting of material about the weld does not reach the outer side 1b so that not only the smoothness but also the appearance of the outer side is not affected in any way by bonding of the plate 1 to the bar 3.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be protected by Letters Patent is:

1. A method of bonding a first metallic component to a light-gage plate-like second metallic component having outer and inner sides and at least one externally ribbed portion, comprising the steps of placing said first component and said inner side of said second component against each other in such a manner that said first component has an aligned superimposed portion which is aligned with and superimposed upon said externally ribbed portion of said second component; and spot welding said aligned superimposed portion of said first component to said externally ribbed portion of said second component by forming welds in said aligned superimposed portion of said first component in such a way that said welds extend through said inner side into the material of said second component but do not penetrate through said externally ribbed portion thereof.

2. A method of bonding a metallic support element having a connecting portion to a light-gage sheet-like metallic member having outer and inner sides and at least one externally integrally ribbed portion, comprising the steps of placing said connecting portion of said support element and said inner side of said sheet-like member against each other while aligning said connecting portion of said support element with said externally integrally ribbed portion of said sheet-like member; and spot welding said connecting portion of said support element to said externally integrally ribbed portion of said sheet-like member by forming welds in said connecting portion of said support element in such a way that said welds extend through the wall of said connecting portion of said support element and through said inner side of said sheet-like member into the material thereof without penetrating to the outer surface of said externally integrally ribbed portion thereof, whereby said outer side of said sheet-like member will be kept free of welds and welding marks.

3. A spot welded structure comprising a metallic support having a connecting portion; a light-gage sheet-like metallic member having an outer side and an inner side engaging said connecting portion of said support, said sheet-like member including at least one externally integrally ribbed portion aligned with said connecting portion of said support; and at least one weld extending through said connecting portion of said support and through said inner side of said sheet-like member into said externally integrally ribbed portion thereof without penetrating to the outer surface of said sheet-like member and its externally integrally ribbed portion, whereby the outer side of said sheet-like member is free of welds and welding marks.

4. A method as set forth in claim 1, wherein said components consist of aluminum containing metallic material and the welding step is carried out by the argon shielded-arc welding process.

5. A method as set forth in claim 1, wherein said components consist of at least partially pure aluminum.

6. A method of bonding the inner side of an externally ribbed light-gage metallic wall component to the skeleton of a railroad vehicle, comprising the steps of placing the inner side of the wall component against the skeleton so that the skeleton has at least one portion aligned with and superimposed upon one externally ribbed portion of said wall component; and spot welding said externally ribbed portion of said wall component to said aligned superimposed portion of said skeleton by forming spaced welds extending from the inner side of said skeleton and penetrating through the skeleton and through the inner side of the wall component into the material of said externally ribbed portion without penetrating through said externally ribbed portion and to the exterior of the wall component.

7. A spot welded structure comprising a first metallic component; a light-gage plate-like second metallic component, said second component having an inner side adjacent to said first component and an outer side provided with at least one projection which is at least partially aligned with said first component; and at least one weld extending through the first component and through the inner side of the second component into the material of said projection but short of the outer side of said first component.

8. A structure as set forth in claim 7, wherein said components consist of at least partially pure aluminum and wherein the outer side of said first component is provided with a plurality of spaced rib like projections, there being a plurality of spaced welds having roots extending into at least one of said projections for bonding the first component to the second component.

9. A structure as set forth in claim 8, wherein said first component is a flanged bar forming part of the skeleton of a railroad vehicle, and said second component is a panel forming part of the wall of the vehicle.

References Cited in the file of this patent

UNITED STATES PATENTS

| 1,290,091 | Cole | Jan. 7, 1919 |
| 1,936,498 | Corbett | Nov. 21, 1933 |

OTHER REFERENCES

"Welding Journal," December 1960, pp. 1230–36.